H. J. BRADT.
DEMOUNTABLE RIM.
APPLICATION FILED APR. 12, 1916.
1,217,144.  Patented Feb. 27, 1917.
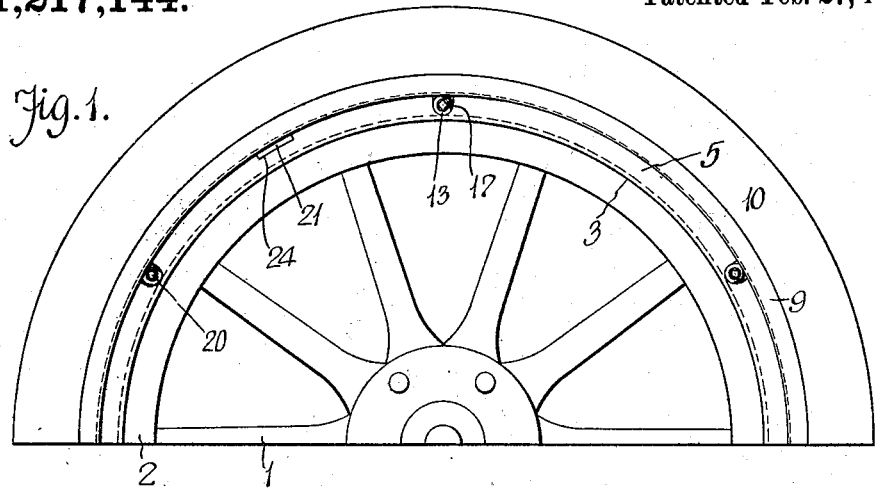
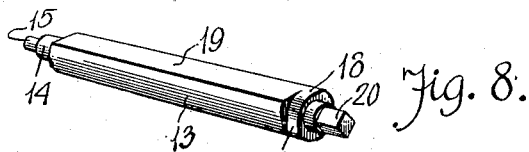
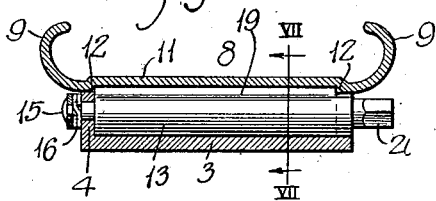
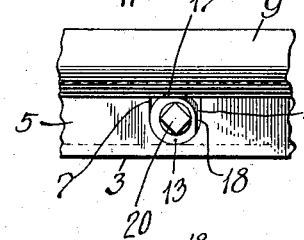
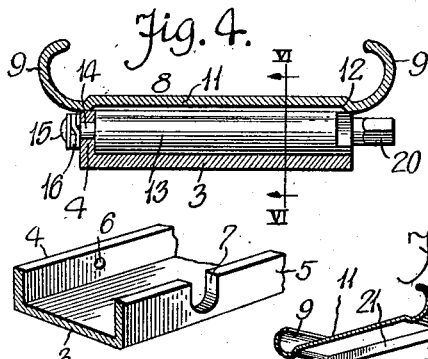
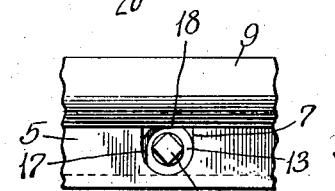
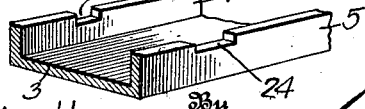
Inventor
Harold J. Bradt,

UNITED STATES PATENT OFFICE.

HAROLD J. BRADT, OF ROYAL OAK, MICHIGAN.

DEMOUNTABLE RIM.

1,217,144.   Specification of Letters Patent.   Patented Feb. 27, 1917.

Application filed April 12, 1916. Serial No. 90,767.

*To all whom it may concern:*

Be it known that I, HAROLD J. BRADT, a citizen of the United States of America, residing at Royal Oak, in the county of Oakland and State of Michigan, have invented certain new and useful Improvements in Demountable Rims, of which the following is a specification, reference being had therein to the accompanying drawings.

This invention relates to demountable rims for vehicle wheels, and the primary object of my invention is the provision of simple and effective means, in a manner as hereinafter set forth, for holding a demountable rim upon the fixed rim of a wheel whereby it may be easily and quickly removed when it is desired to substitute another tire for that on the wheel.

Another object of my invention is to furnish a wheel with a holding means that avoids circumferential creepings or shifting of the demountable rim relative to the rim of a wheel, and at the same time excludes dirt and foreign matter liable to impair the fitting of a demountable rim upon a fixed rim.

A further object of my invention is to provide a wheel with a demountable rim and fastening means therefor consisting of comparatively few parts, inexpensive to manufacture, easy to manipulate, and highly efficient as a wheel construction for motor vehicles.

With the above and other objects in view, my invention resides in matters to be hereinafter referred to, and reference will now be had to the drawing, wherein—

Figure 1 is a side elevation of a portion of a vehicle wheel in accordance with my invention;

Fig. 2 is a cross sectional view of a demountable rim held relative to a fixed rim;

Fig. 3 is a side elevation of a portion of the same;

Fig. 4 is a cross sectional view of the demountable rim on a rim and in a released position;

Fig. 5 is a side elevation of a portion of the same;

Fig. 6 is a longitudinal sectional view taken on line VI—VI of Fig. 2;

Fig. 7 is a similar view taken on the line VII—VII of Fig. 4;

Fig. 8 is a perspective view of a detached locking member;

Fig. 9 is a perspective view of a portion of the fixed rim;

Fig. 10 is a perspective view of a portion of the demountable rim showing a transverse cleat, and Fig. 11 is a perspective view of a portion of a fixed rim constructed to receive the cleat shown in Fig. 10.

In the drawing, 1 denotes wheel spokes connected by a felly 2 and mounted upon the felly 2 in the usual and well known manner is a channel rim 3 having side flanges 4 and 5. In case of a wheel having wire spokes, this channel rim 3 will constitute a felly by having the wire spokes of the wheel connected direct thereto.

At suitable points throughout the periphery of the rim 3, the inner side flange 4 thereof has openings 6 and the outer side flange 5 U-shaped notches or seats 7 opposite the opening 6.

Detachably mounted upon the flanges 4 and 5 of the rim 3 is a demountable rim 8 having clencher flanges 9 adapted to engage and hold the clencher or beaded edges of a tire casing 10. The demountable rim 8 is formed to accurately fit upon the flanges of the rim 3 and said demountable rim has an annular raised portion 11 providing an annular depression in the inner wall of said member and this annular depression confronts the channel of the rim 3 and provides annular shoulders 12 substantially in a plane with the inner walls of the flanges 4 and 5 of the rim 3.

In the rim 3 are placed cylindrical locking members 13 and the inner ends of said members are reduced to form stems 14 to extend through the openings 6 of the inner flange 4 and rotatably support the inner ends of the locking members. The outer ends of the locking members are rotatably supported in the seats 7 of the side flange 5, and to prevent accidental displacement of said locking members, the stems 14 are provided with heads 15 and springs 16 interposed between the heads 15 and the outer wall of the side flange 4.

The locking members 13 are of a diameter greater than the depth of the channel of the rim 3 and consequently the peripheries of said locking members will extend into the annular depression of the demountable rim 8 with the ends of the locking members engaging the annular shoulders 12. In order that this may be accomplished particularly at the outer flange 5 of the rim 3, it is necessary that the outer ends of the locking members 13 be turned down to clear the demountable rim 8, and in turning down or reducing the outer ends of the locking members, stop shoulders 17 and 18 are formed, the latter being in a plane with a flat facet 19 of each locking member which permits of the demountable rim 8 being removed when the locking members are turned with the flat facets confronting the demountable rim. The flat facets 19 will be in alinement with the outer edges of the flanges 4 and 5 when removing or placing the demountable rim 8 relative to the rim 3 and this position of the facets 19 is determined by the stop shoulders 18 impinging against the demountable rim. When the stop shoulders 17 impinge against the demountable rim 8, the cylindrical portions of the locking members extend into the annular depression of the demountable rim, engaging the annular shoulders 12 and preventing lateral displacement of the demountable rim relative to the fixed rim.

To facilitate adjusting the locking members 13, the outer ends thereof are reduced to provide rectangular shanks 20 protruding from the outer flange 5 of the rim 3. Spanner wrenches or keys may be easily placed upon the shanks 20 to partially rotate the locking members and release or lock the demountable rim 8 relative to the rim 3.

To prevent circumferential creeping of the demountable rim 8 relative to the rim 3, said demountable rim at suitable points throughout the circumference thereof has transverse cleats 21 with the inner ends thereof reduced to provide tongues 22. The flanges 4 and 5 of the rim 3 are notched, as at 23 and 24 to receive the cleats 21 and the tongue ends of said cleats present shoulders to abut the inner walls of the flange 4 and limit the inward or sliding on movement of the demountable rim 8 relative to the fixed rim. The ends of the cleats 21 completely fill the notches 23 and 24 and since the ends of the locking members close the openings 6 and the seats 7 of the rim, dirt and foreign matter are excluded from the channel of this rim and the demountable rim can be easily shifted on and off of the flanges 4 and 5.

With the locking members of a diameter to fit between the rim 3 and the demountable rim 8, these members will coöperate with the side flanges 4 and 5 of the rim in supporting the demountable rim relative to the fixed rim, and besides the raised portion 11 of the demountable rim providing annular abutments for the ends of the locking members, the raised portion also strengthens and reinforces the demountable rim and adds rigidity thereto.

While in the drawing there is illustrated a preferred embodiment of my invention, it is to be understood that the structural elements are susceptible to such variations and modifications as fall within the scope of the appended claims.

What I claim is:—

1. In a vehicle wheel, a channel rim having flanges, a demountable rim adapted to fit on said rim flanges, said demountable rim having an annular raised portion, rotatable locking members journaled in the flanges of said channel rim and adapted to extend into the raised portion of said demountable rim, and means at the outer ends of said locking members limiting the rotative movement of said members.

2. In a vehicle wheel, a channel rim having flanges, a demountable rim adapted to fit on said rim flanges, said demountable rim having an annular raised portion, rotatable members journaled in the flanges of said channel rim and adapted to extend into the raised portion of said demountable rim, means at the outer ends of said locking members limiting the rotative movement of said members, and means carried by said demountable rim extending into the flanges of said channel rim adapted to prevent circumferential movement of said demountable rim relative to said channel rim.

3. In a vehicle wheel, a channel rim having side flanges, a demountable rim adapted to fit on said rim flanges and formed with an annular raised portion providing annular shoulders, rotatable locking members in said channel rim adapted to extend into the raised portion of said demountable rim and engage the annular shoulders thereof, said members having flat facets adapted to be placed in a plane with the edges of the flanges of said channel rim to permit of said demountable rim being laterally moved, and means carried by said demountable rim and engaging in the flanges of said channel rim adapted to prevent circumferential movement of said demountable rim relative to said channel rim.

4. In a vehicle wheel, a channel rim, a demountable rim on said channel rim having raised portions, and rotatable members in said channel rim adapted to extend into the raised portion of said demountable rim, said rotatable members having shoulders at the outer ends thereof to impinge against said demountable rim and limit the rotation of said members in said demountable rim.

5. In a vehicle wheel, a fixed rim, a demountable rim thereon having annular shoulders, and members in said fixed rim adapted to have the ends thereof engage the shoulders of said demountable rim to prevent lateral displacement of said demountable rim relative to said fixed rim, said members having flat facets adapted to confront said demountable rim and permit of said demountable rim being moved on said fixed rim.

In testimony whereof I affix my signature in the presence of two witnesses.

HAROLD J. BRADT.

Witnesses:
KARL H. BUTLER,
MARY E. BRADT.

Copies of this patent may be obtained for five cents each, by addressing the "Commissioner of Patents, Washington, D. C."